United States Patent
Chang et al.

(10) Patent No.: US 8,276,453 B2
(45) Date of Patent: Oct. 2, 2012

(54) TOUCHLESS INPUT DEVICE

(75) Inventors: Shu-Yuan Chang, Taipei County (TW); Hsu-Cheng Deng, Hsinchu (TW); Shih-Bin Luo, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 508 days.

(21) Appl. No.: 12/643,952

(22) Filed: Dec. 21, 2009

(65) Prior Publication Data

US 2011/0077757 A1 Mar. 31, 2011

(30) Foreign Application Priority Data

Sep. 30, 2009 (TW) ................................ 98133258 A

(51) Int. Cl.
G01N 29/00 (2006.01)
G01B 17/00 (2006.01)
G06F 3/041 (2006.01)

(52) U.S. Cl. ............................ 73/627; 702/159; 345/173
(58) Field of Classification Search .................... 73/627, 73/596, 598, 600, 618, 620; 702/159, 158; 345/173, 177; 600/437
See application file for complete search history.

(56) References Cited

U.S. PATENT DOCUMENTS

| | | | | |
|---|---|---|---|---|
| 6,130,663 A * | 10/2000 | Null | | 345/158 |
| 7,566,859 B2 * | 7/2009 | Shih | | 250/214 LS |
| 7,725,288 B2 * | 5/2010 | Boillot | | 702/159 |
| 7,834,850 B2 * | 11/2010 | Boillot et al. | | 345/158 |
| 7,856,883 B2 * | 12/2010 | Chang et al. | | 73/627 |
| 8,060,841 B2 * | 11/2011 | Boillot et al. | | 715/863 |
| 2007/0120835 A1 * | 5/2007 | Sato | | 345/173 |
| 2007/0211131 A1 * | 9/2007 | Iijima | | 347/108 |
| 2008/0256494 A1 * | 10/2008 | Greenfield | | 715/863 |
| 2009/0235750 A1 | 9/2009 | Chang et al. | | |
| 2012/0001875 A1 * | 1/2012 | Li et al. | | 345/177 |

FOREIGN PATENT DOCUMENTS

| | | |
|---|---|---|
| TW | I237186 | 8/2005 |
| TW | I291890 | 1/2008 |
| TW | I303775 | 12/2008 |
| TW | 200900120 | 1/2009 |

OTHER PUBLICATIONS

"First Office Action of China Counterpart Application", issued on Dec. 31, 2011, p. 1-p. 7.

* cited by examiner

Primary Examiner — J M Saint Surin
(74) Attorney, Agent, or Firm — Jianq Chyun IP Office

(57) ABSTRACT

An input device, including two or more ultrasonic transducers (UTs) driven by a driving signal (DS) for respectively sending a transmitting signal to sense an object; a driving circuit unit (DCU) generating the DS; a receiving circuit unit (RCU) determining whether echo signals (ESs) respectively returned from the two or more UTs are greater than a threshold value; a diplexer receiving and transmitting the DS to the two or more UTs, or receiving and transmitting the ESs to the RCU; and a control unit controlling the DCU to generate the DS, controlling the operation of the diplexer, and obtaining a relative motion information between the object and at least one of the two or more UTs according to all of ESs greater than the threshold value and determined by the RCU, so as to correspondingly output an input signal, is provided.

14 Claims, 13 Drawing Sheets

TOUCHLESS INPUT DEVICE

CROSS-REFERENCE TO RELATED APPLICATION

This application claims the priority benefit of Taiwan application serial no. 98133258, filed on Sep. 30, 2009. The entirety of the above-mentioned patent application is hereby incorporated by reference herein and made a part of specification.

BACKGROUND OF THE DISCLOSURE

1. Field of the Disclosure

The present disclosure relates to an input device, and more particularly, to a touchless input device and application thereof.

2. Description of the Related Art

Ever since Apple Inc. presented the iPhone and the iPod to the public, the touch man-machine interface (MMI) has become increasingly fashionable. The touch MMI provides a more instinctive and convenient user experience, and so such technology has gradually spread from cellular phones to IT consumer electronic products such as notebooks, digital cameras, handheld game consoles, computer keyboards, and electronic dictionaries, etc. However, since operating a typical touch panel requires pressing a finger on the display panel, such that the operation thereof is limited to a "planar operation", the degrees of freedom of a waving human finger are not fully utilized. Moreover, after usage, many residual fingerprints are likely to remain on the display panel, such that after a long period of use the display panel would become dirty or filled with germs thereon. As for applications in the public, for example a hospital information inquiry terminal or an automated teller machine, people may worry whether germs have remained from previous operators, especially in light of the recent epidemic diseases such as SARS (Severe Acute Respiratory Syndrome), enteroviruses, H1N1, etc. that are highly infectious diseases. Therefore, people may have major misgivings about virus infections through touch.

Accordingly, a technical concept of touchless operation arises in order for the user to directly use hands for operation, without having to wear any sensing devices. The touchless technical concept is needed in a situation in which the user can wave gestures in different directions to achieve the purpose of input without touching the screen, and by simple waves of the palms in coordination with different applicable situations combined with backend application programs, the user is able to obtain different responses at the output terminal. Taiwan Patent Nos. I291890, I303775 and I237186, as well as Taiwan Patent Publication No. 200900120 disclose touchless techniques.

In Taiwan Patent No. I291890 (hereinafter "890 patent"), for example, the 890 patent applies for "AN ELECTRIC DEVICE WITH MOTION DETECTION ABILITY", which uses a micro-inertial sensing module (e.g., accelerometer, gyroscope, etc.) to sense the moving and rotating actions of a pair of hands and accordingly generates sensing signals to a sensing signal processing unit for performing signal processing, so as to serve as an input to make the electric device generate response. However, the 890 patent still requires adopting a hand-holding scheme for input, such that in public usage the proposed device cannot avoid the issues of residual dirt, germs, etc. caused by multi-user operation.

In Taiwan Patent Publication No. 200900120 (hereinafter "120 patent"), for example, the 120 patent applies for "AN INTERACTIVE GAMING SYSTEM", which includes a positioning host and a wireless controller. The positioning host has a first, a second and a third ultrasonic receiving modules; and the wireless controller has an ultrasonic transmitting module. After the first, the second and the third ultrasonic receiving modules of the positioning host receive the ultrasonic signal transmitted by the ultrasonic transmitting module of the wireless controller, the positioning host would calculate the coordinates of the wireless controller, and thus the positioning host would obtain and display the coordinates of the wireless controller on a display device. However, even though the 120 patent can utilize the degrees of freedom for human hands in three-dimensional (3D), the user is still required to wear sensors, thereby making the proposed gaming system inconvenient to use.

In Taiwan Patent No. I303775 (hereinafter "775 patent"), for example, the 775 patent applies for "A MOTION DETECTION SYSTEM AND MOTION DETECTION METHOD", in which the motion detection system is composed by a sensing display panel, a plurality of switching units, a detection unit and a control unit. A plurality of metal sensing areas are set on the sensing display panel, and each of the metal sensing areas is sequentially set to be a detection sensing area. Each of the metal sensing areas is electrically connected to a switching unit so as to switch the potential of each of the metal sensing areas. During a detection phase, the detection unit calculates a discharging time of the detection sensing area so as to generate a detection result signal. However, the 775 patent detects the motion of fingers on the sensing display panel by using characteristics of the capacitance effect and the hardware configuration. Even though the 775 patent discloses a detection without touching the display panel, since the range of application for capacitive motion detection is not far enough, and due to the limiting measurement area of the fingers, the sensing range is only a few centimeters. Accordingly, the proposed system and method seem quite inconvenient for use.

In Taiwan patent No. 1237186 (hereinafter "186 patent"), for example, the 186 patent applies for "AN INTERACTIVE BOOK SYSTEM BASED ON ULTRASONIC POSITION DETERMINATION", which includes an ultrasonic pointing unit, an ultrasonic base unit, a control unit and a response unit to allow a reader to interact with the printed material by placing the ultrasonic pointing unit on various areas of the printed page. However, since the reader must wear a sensor (i.e. the ultrasonic pointing unit) to input, the proposed book system also seems quite inconvenient for use.

SUMMARY OF THE DISCLOSURE

The present disclosure is directed to an input device which can achieve an effect of touchless operation input by simply waving hands without wearing any sensing devices/sensors.

The present disclosure provides an input device including at least two ultrasonic transducers, a driving circuit unit, a receiving circuit unit, a diplexer and a control unit. The ultrasonic transducers are driven by a driving signal, and used for respectively sending a transmitting signal to sense an object. When the ultrasonic transducers sense the object, each of the ultrasonic transducers generates an echo signal. The driving circuit unit is used for generating the driving signal. The receiving circuit unit is used for determining whether echo signals respectively returned from the ultrasonic transducers are greater than a threshold value or not. The diplexer is coupled to the ultrasonic transducers, the driving circuit unit and the receiving circuit unit, and used for receiving and transmitting the driving signal to the ultrasonic transducers, or receiving and transmitting the echo signals respectively returned from the ultrasonic transducers to the receiving circuit unit. The control unit is coupled to the driving circuit unit, the receiving circuit unit and the diplexer, and used for controlling the driving circuit unit to generate the driving signal for each of a plurality of first predetermined times, controlling the diplexer to transmit the driving signal or transmit the echo signals respectively returned from the ultrasonic transducers, and obtaining a relative motion information between the object and at least one of the ultrasonic transducers according to all of echo signals which are greater than the threshold value and determined by the receiving circuit unit for each of a plurality of second predetermined times, so as to correspondingly output an input signal. The relative motion information at least includes a sheltering information, a motion information, a motion speed information and a distance information; and the input signal is corresponding to a combination of the sheltering information, the motion information, the motion speed information and the distance information.

The present disclosure also provides an input device including at least one first ultrasonic transducer, at least two second ultrasonic transducers, a driving circuit unit, a receiving circuit unit, and a control unit. The first ultrasonic transducer is driven by a driving signal, and used for sending a transmitting signal to sense an object. When the transmitting signal senses the object, each of the second ultrasonic transducers generates an echo signal. The driving circuit unit is coupled to the first ultrasonic transducer, and used for generating the driving signal. The receiving circuit unit is coupled to the second ultrasonic transducers, and used for determining whether echo signals respectively returned from the second ultrasonic transducers are greater than a threshold value or not. The control unit is coupled to the driving circuit unit and the receiving circuit unit, and used for controlling the driving circuit unit to generate the driving signal for each of a plurality of first predetermined times, and obtaining a relative motion information between the object and at least one of the second ultrasonic transducers according to all of the echo signals which are greater than the threshold value and determined by the receiving circuit unit for each of a plurality of second predetermined times, so as to correspondingly output an input signal. The relative motion information at least includes a sheltering information, a motion information, a motion speed information and a distance information. Moreover, the input signal corresponds to a combination of the sheltering information, the motion information, the motion speed information and the distance information.

It is to be understood that both the foregoing general description and the following detailed description are exemplary, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
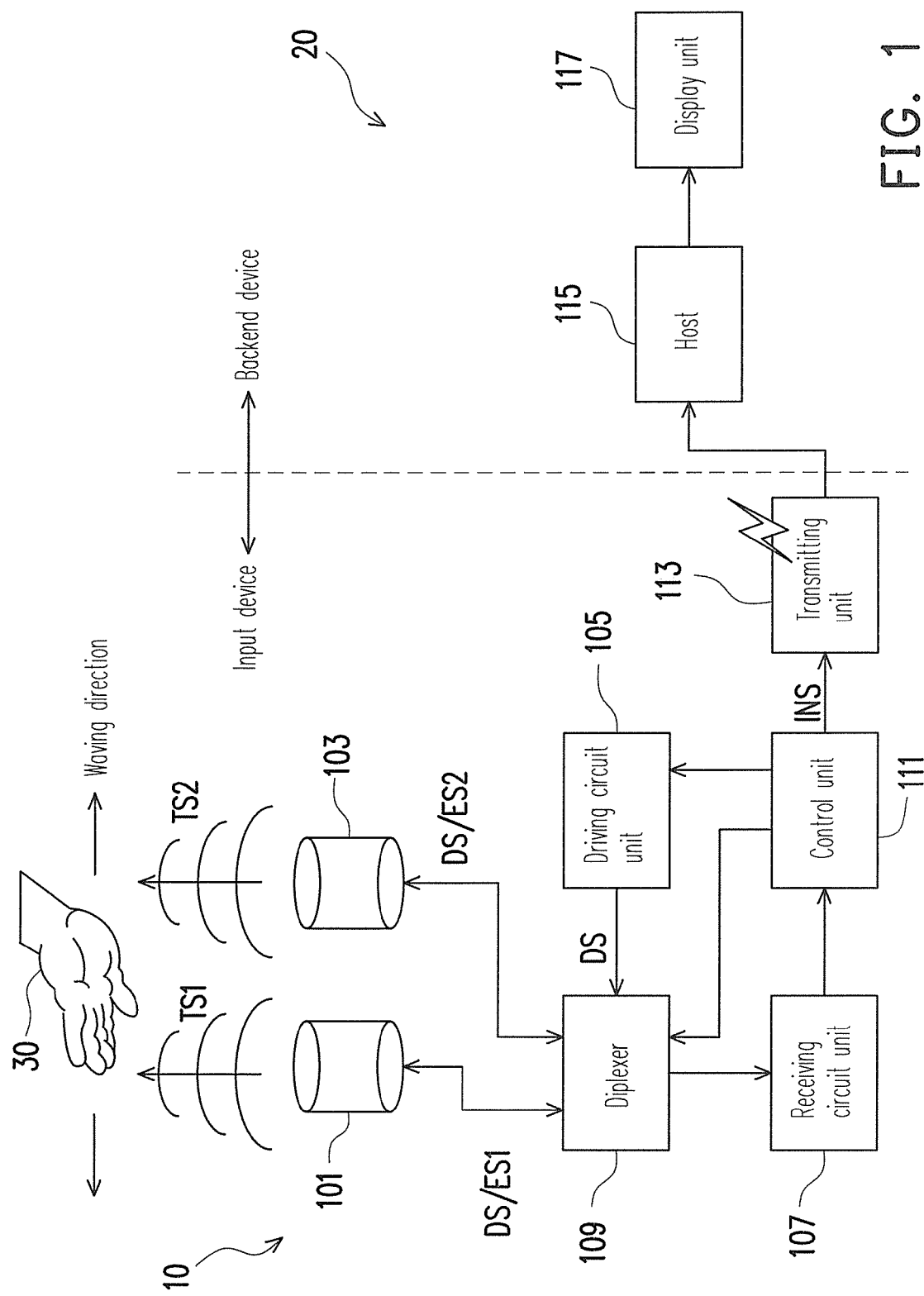
FIG. 1 is a diagram of an electronic device with motion detection ability according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a diagram of an electronic device 100 with motion detection ability according to an embodiment of the present disclosure. Referring to FIG. 1, the electronic device 100 with motion detection ability includes an input device 10 and a backend device 20. The input device 10 includes two ultrasonic transducers 101 and 103, a driving circuit unit 105, a receiving circuit unit 107, a diplexer 109, a control unit 111 and a transmitting unit 113. The backend device 20 includes a host 115 and a display unit 117.

In this embodiment, the ultrasonic transducers 101 and 103 are both driven by a driving signal DS and used for sending the transmitting signals TS1 and TS2 to sense an object 30 (e.g., hands, but not limited thereto). It should be noted that the ultrasonic transducer first transforms electrical energy into mechanical energy by using the piezoelectric effect, so as to transmit the transmitting signal outward in a longitudinal wave direction by air vibration, serving as the transmission medium in the air. After the transmitting signal transmitted by the ultrasonic transducer senses the object, the vibration wave (i.e. mechanical wave) would transmit back to the ultrasonic transducer, and then the ultrasonic transducer would transform the mechanical wave into an electrical energy (i.e. echo signal) to sense whether the object exists or not based on such principle. Moreover, the ultrasonic transducers 101 and 103 may use any types of ultrasonic transducers bulletined on the Pro-Wave Electronic Corporation's website as below:
http://www.prowave.com.tw/chinese/item/cut.htm.

The driving circuit unit 105 is used for generating the driving signal DS. In this embodiment, the driving circuit unit 105 may adopt the pulse echo method to generate a tone burst to be served as the driving signal DS, and a pulse repeat frequency (PRF) rate of the driving signal DS may be 100 Hz, but not limited thereto. The receiving circuit unit 107 is used for determining whether echo signals ES1 and ES2 respectively returned from the ultrasonic transducers 101 and 103 are greater than a threshold value or not. The diplexer 109 is coupled to the ultrasonic transducers 101 and 103, the driving circuit unit 105 and the receiving circuit unit 107, and used for receiving and transmitting the driving signal DS generated by the driving circuit unit 105 to the ultrasonic transducers 101 and 103, or receiving and transmitting the echo signals ES1 and ES2 respectively returned from the ultrasonic transducers 101 and 103 to the receiving circuit unit 107.

The control unit 111 is coupled to the driving circuit unit 105, the receiving circuit unit 107 and the diplexer 109, and used for controlling the driving circuit unit 105 to generate the driving signal DS for each of a plurality of first predetermined times (each first predetermined time=1/PRF, for example, 0.01 S for PRF=100 Hz, but not limited thereto), controlling the diplexer 109 to transmit the driving signal DS generated by the driving circuit unit 105 or transmit the echo signals ES1 and ES2 respectively returned from the ultrasonic transducers 101 and 103, and obtaining a relative motion information between the object 30 and at least one of the ultrasonic transducers 101 and 103 according to all of echo signals ES1 and/or ES2 which are greater than the threshold value and determined by the receiving circuit unit 107 for each of a plurality of second predetermined times (for example, 0.5 S, but not limited thereto), so as to correspondingly output an input signal INS.

Besides, the control unit 111 is further used for counting each of the plurality of first and second predetermined times, storing all of the echo signals ES1 and/or ES2 which are greater than the threshold value and determined by the receiving circuit unit 107 for each of the plurality of second predetermined times, storing times) from at least one of the ultrasonic transducers 101 and 103 sending the transmitting signals TS1, TS2 to the $1^{st}$ echo signal ES1 and/or ES2 which are/is greater than the threshold value and determined by the receiving circuit unit 107 for each of the plurality of second predetermined times, and determining whether all of the echo signals ES1 and/or ES2 which are greater than the threshold value and determined by the receiving circuit unit 107 for each of the plurality of second predetermined times are only returned from one of the ultrasonic transducers 101 and 103 or not.

In this embodiment, the control unit 111 may be implemented by a microprocessor, but not limited thereto. Accordingly, the control unit 111 may respectively count each of the plurality of first and second predetermined times through two internal timers (not shown) thereof. In addition, the control unit 111 further may store all of the echo signals ES1 and/or ES2 which are greater than the threshold value and determined by the receiving circuit unit 107 for each of the plurality of second predetermined times, and store time(s) from at least one of the ultrasonic transducers 101 and 103 sending the transmitting signals TS1, TS2 to the $1^{st}$ echo signal ES1 and/or ES2 which are/is greater than the threshold value and determined by the receiving circuit unit 107 for of the plurality of each second predetermined times through an internal memory (not shown) thereof. Therefore, the control unit 111 may refer to data/information stored in its internal memory to determine whether all of the echo signals ES1 and/or ES2 which are greater than the threshold value and determined by the receiving circuit unit 107 for each of the plurality of second predetermined times are only returned from one of the ultrasonic transducers 101 and 103 or not.

The transmitting unit 113 is coupled to the control unit 111, and used for receiving the input signal INS outputted from the control unit 111 and transmitting the received input signal INS by a wired or wireless transmission mode. In this embodiment, the wired transmission mode may transmit the received input signal INS by RS-232, USB, Ethernet, etc., but not limited thereto. Moreover, the wireless transmission mode may transmit the received input signal INS by Bluetooth, infrared rays, etc., but not limited thereto. The host 115 is used for receiving the input signal INS transmitted by the transmitting unit 113, and accordingly controlling the display unit 117 to show an output response corresponding to the input signal INS by images, voices or other schemes. For example, in a guided tour of a museum, images are used to display the frames of the guided tour, or during music playback, the volume and song changes can be controlled, though it should be noted that applications are not limited thereto.

Figure 2:
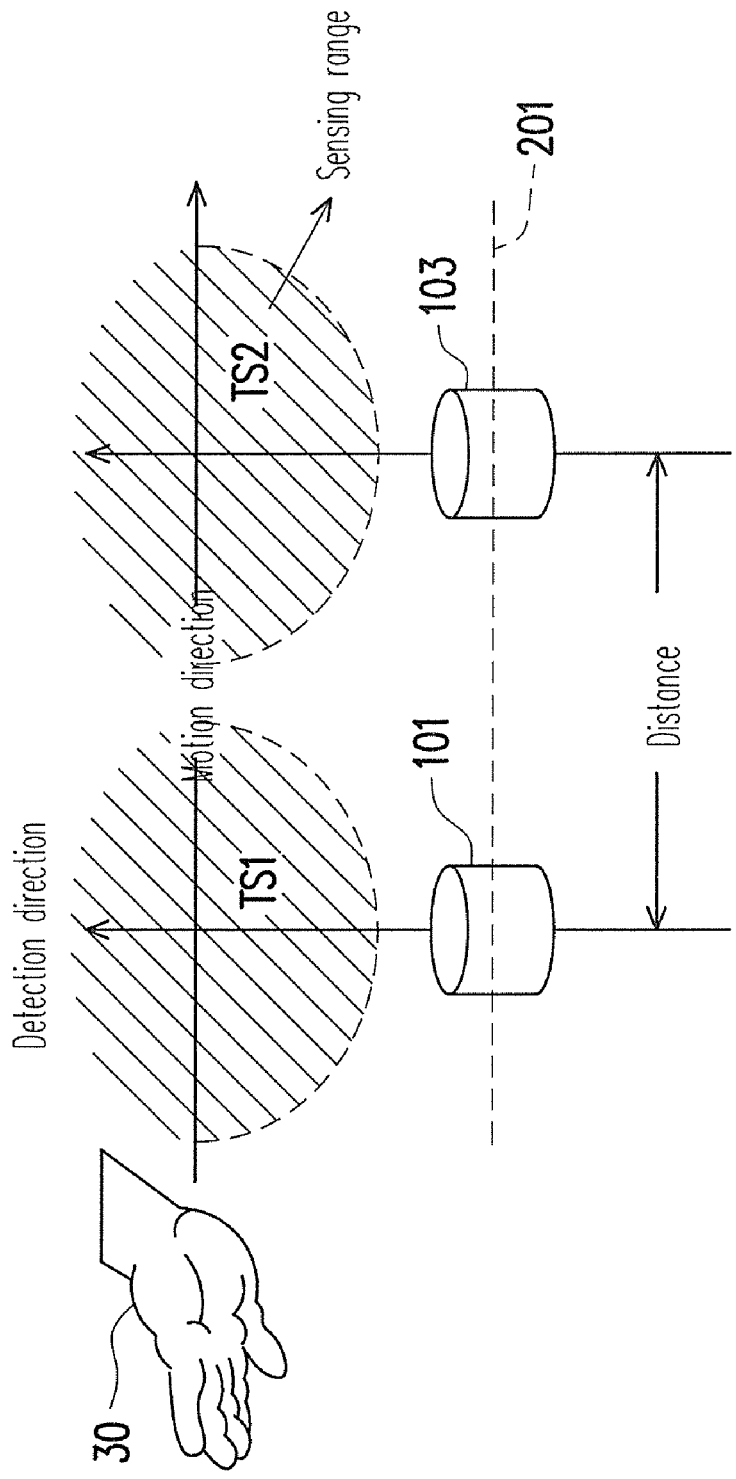
FIG. 2 is a diagram of two ultrasonic transducers which are located at a same horizontal plane line according to an embodiment of the present disclosure.

In this embodiment, when the ultrasonic transducers 101 and 103 are located at a same horizontal plane line 201 as shown in FIG. 2, the relative motion information between the object 30 and at least one of the ultrasonic transducers 101 and 103 and obtained by the control unit 111, includes a left sheltering information, a right sheltering information, a motion information from left to right, a motion information from right to left, a left-right motion speed information and/or a distance information, wherein the distance information is a distance between the object 30 and at least one of the ultrasonic transducers 101 and 103.

Figure 3:
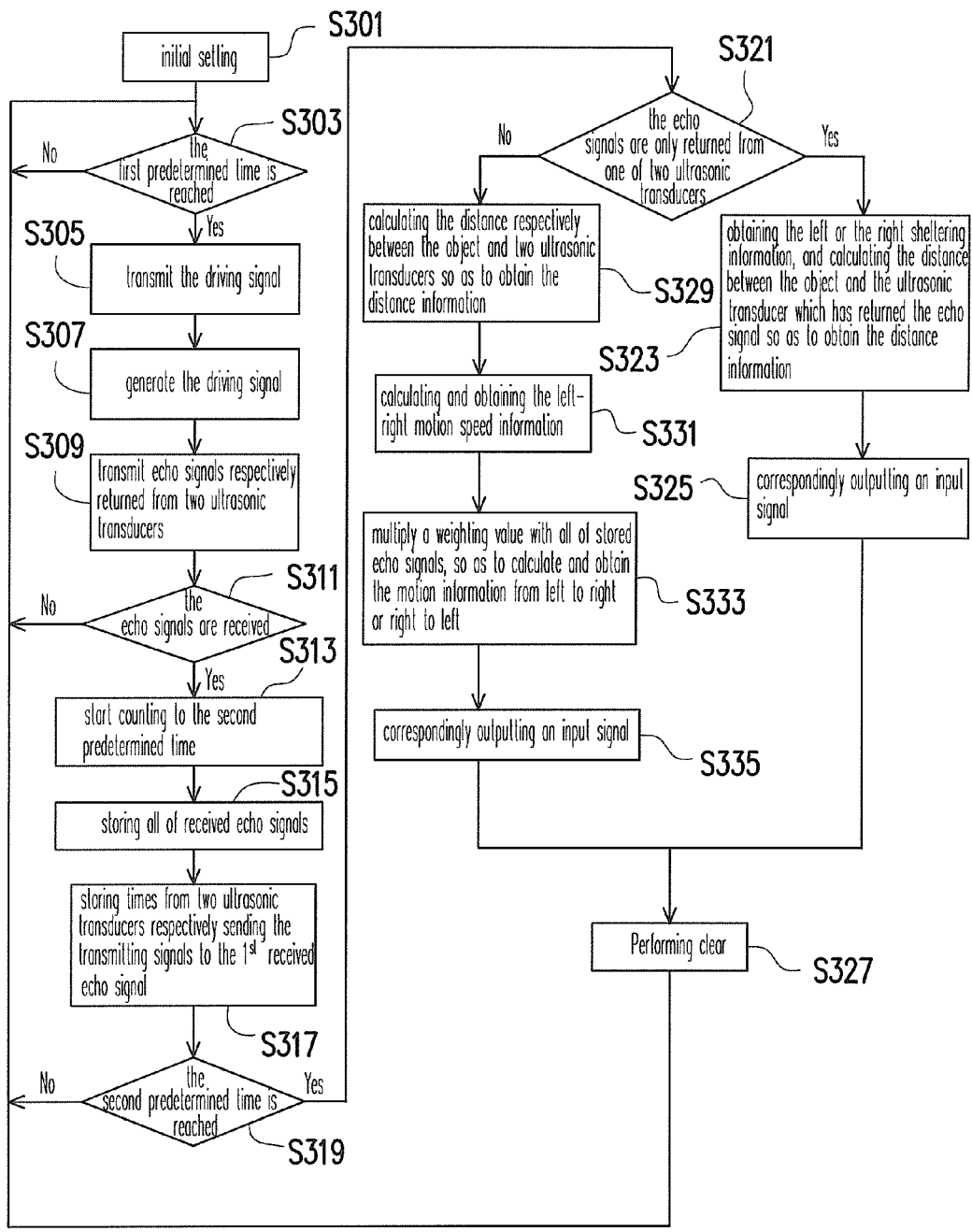
FIG. 3 is an operation flow chart of a control unit in FIG. 1.

Based on the conditions of that the ultrasonic transducers 101 and 103 are located at the same horizontal plane line 201, FIG. 3 is an operation flow chart of the control unit 111 according to an embodiment of the present disclosure. Referring to FIGS. 1 to 3, the control unit 111 would first perform an initial setting (in Step S301), and then start count to the first predetermined time (for example, 0.01 S) through an internal timer defined as a first timer herein to determine whether the first predetermined time is reached or not (in Step S303).

When the control unit 111 counts to the first predetermined time (i.e. the determination result in Step S303 is "Yes"), the control unit 111 would first set the diplexer 109 to transmit the driving signal DS (in Step S305), and then control the driving circuit unit 105 to generate the driving signal DS to the diplexer 109 (in Step S307). Accordingly, the diplexer 109 would transmit the driving signal DS to the ultrasonic transducers 101 and 103, so as to make the ultrasonic transducers 101 and 103 be driven by the driving signal DS to transmit the transmitting signals TS1 and TS2 to sense the object 30. However, if the control unit 111 has not counted to the first predetermined time yet (i.e. the determination result in Step S303 is "No"), then the operation flow returns to Step S303.

After the control unit 111 controls the driving circuit unit 105 to generate the driving signal DS, and the diplexer 109 has transmitted the driving signal DS to the ultrasonic transducers 101 and 103, the control unit 111 then would immediately set the diplexer 109 to transmit the echo signals ES1 and ES2 respectively returned from the ultrasonic transducers 101 and 103 to the receiving circuit unit 107 (in Step S309). Accordingly, the receiving circuit unit 107 would start to determine whether the echo signals ES1 and ES2 respectively returned from the ultrasonic transducers 101 and 103 are greater than a threshold value or not.

Figure 4:
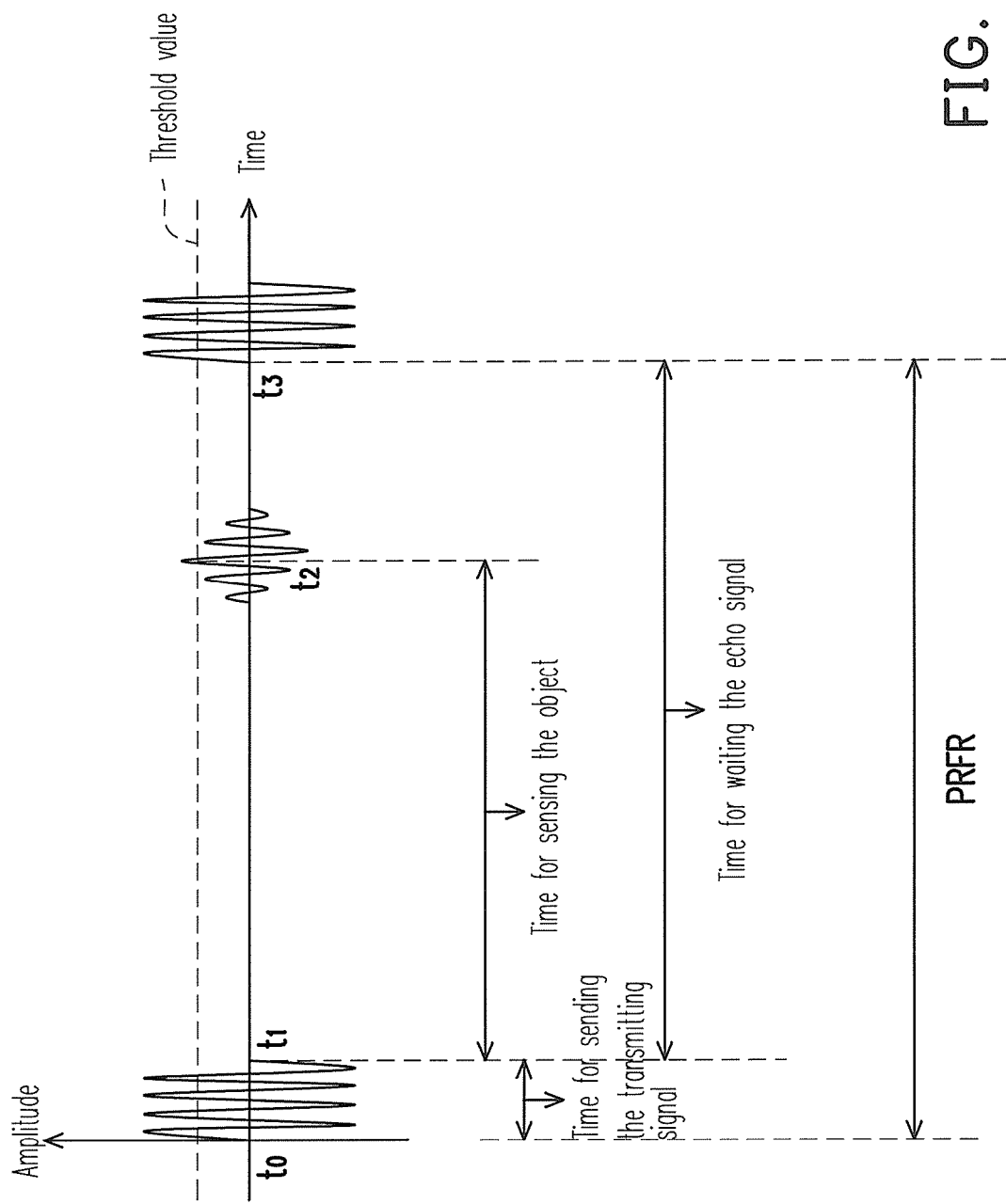
FIG. 4 is an operation diagram of two ultrasonic transducers according to an embodiment of the present disclosure.

For example, FIG. 4 is an operation diagram of the ultrasonic transducers 101 and 103 according to an embodiment of the present disclosure. It can be clearly seen that, in FIG. 4, a time $t_0$ to $t_1$ is the time for the ultrasonic transducers 101 and 103 to transmit the transmitting signals TS1 and TS2; a time $t_1$ to $t_2$ is the time for the ultrasonic transducers 101 and 103 to sense the object 30; a time $t_1$ to $t_3$ is the time for the ultrasonic transducers 101 and 103 to wait for the echo signals ES1 and ES2; and a time $t_0$ to $t_3$ is the pulse repeat frequency rate PRFR of the driving signal DS. In this embodiment, the receiving circuit unit 107 only transmits the echo signals ES1 and ES2 respectively returned from the ultrasonic transducers 101 and 103 and greater than the threshold value to the control unit 111. Moreover, the control unit 111 would continuously monitor/determine whether the echo signals ES1 and ES2 greater than the threshold value are received or not (in Step S311).

Once the control unit 111 has received the echo signals ES1 and/or ES2 greater than the threshold value (i.e. the determination result in Step S311 is "Yes"), the control unit 111 would start count to the second predetermined time (for example, 0.5 S) through another internal timer defined as a second timer herein (in Step S313), and store all of the echo signals ES1 and/or ES2 greater than the threshold value and transmitted by the receiving circuit unit 107 in its internal memory (in Step S315), and times from the ultrasonic transducers 101 and 103 sending the transmitting signals TS1, TS2 to the $1^{st}$ echo signal ES1 and/or ES2 which are/is greater than the threshold value and determined by the receiving circuit unit 107 for each of the plurality of second predetermined times (in Step S317). Namely, time for time $t_1$ of the ultrasonic transducers 101 and 103 subtracted from time $t_2$ of the ultrasonic transducers 101 and 103. Herein, time for time $t_1$ of the ultrasonic transducer 101 subtracted from time $t_2$ of the ultrasonic transducer 101 is defined as $T_A$; and time for time $t_1$ of the ultrasonic transducer 103 subtracted from time $t_2$ of the ultrasonic transducer 103 is defined as $T_B$. However, if the control unit 111 has not received any echo signals ES1 and/or ES2 greater than the threshold value (i.e. the determination result in Step S311 is "No"), the operation flow returns to Step S303.

When the control unit 111 is in the process of storing the echo signals ES1 and/or ES2 greater than the threshold value and transmitted by the receiving circuit unit 107, the control unit 111 would determine whether the second predetermined time counted by the second timer is counted or not (in Step S319). If the control unit 111 determines that the second timer has counted to the second predetermined time (i.e. the determination result in Step S319 is "Yes"), the control unit 111 would then determine whether all of the echo signals ES1 and/or ES2 which are greater than the threshold value and determined by the receiving circuit unit 107 for the second predetermined time are only returned from one of the ultrasonic transducers 101 and 103 or not (in Step S321). However, if the control unit 111 determines that the second timer has not counted to the second predetermined time yet (i.e. the determination result in Step S319 is "No"), the operation flow returns to Step S303.

In this embodiment, the control unit 111 may store all of echo signals ES1 greater than the threshold value and determined by the receiving circuit unit 107 for the second predetermined time to be represented as positive logic "1" (i.e. +1) in its internal memory, and may store all of echo signals ES2 greater than the threshold value and determined by the receiving circuit unit 107 for the second predetermined time to be represented as negative logic "1" (i.e. −1) in its internal memory. Therefore, the control unit 111 would obtain whether all of the echo signals ES1 and/or ES2 which are greater than the threshold value and determined by the receiving circuit unit 107 for the second predetermined time are only returned from one of the ultrasonic transducers 101 and 103 or not by surveying all of the data stored in its internal memory.

For example, when the control unit 111 surveys that all of data stored in its internal memory are all positive logic "1", it represents that all of the echo signals (i.e. ES1) which are greater than the threshold value and determined by the receiving circuit unit 107 for the second predetermined time are only returned from the ultrasonic transducer 101. In addition, when the control unit 111 surveys that all of the data stored in its internal memory are all negative logic "1", it represents that all of the echo signals (i.e. ES2) which are greater than the threshold value and determined by the receiving circuit unit 107 for the second predetermined time are only returned from the ultrasonic transducer 103.

When the control unit 111 determines that all the echo signals (i.e. ES1 or ES2) which are greater than the threshold value and determined by the receiving circuit unit 107 for the second predetermined time are only returned from the ultrasonic transducer 101 or 103 (i.e. the determination result in Step S321 is "Yes"), the control unit 111 would obtain the left or the right sheltering information. Namely, if the control unit 111 determines that all the echo signals (i.e. ES1) which are greater than the threshold value and determined by the receiving circuit unit 107 for the second predetermined time are only returned from the ultrasonic transducer 101, the control unit 111 would obtain the left sheltering information, that is, the object 30 now is sheltering above the ultrasonic transducer 101. On the contrary, if the control unit 111 determines that all the echo signals (i.e. ES2) which are greater than the threshold value and determined by the receiving circuit unit 107 for the second predetermined time are only returned from the ultrasonic transducer 103, the control unit 111 would obtain the right sheltering information, that is, the object 30 now is sheltering above the ultrasonic transducer 103. Besides, the control unit 111 would further calculate the distance between the object 30 and the ultrasonic transducer 101 or 103 which has returned the echo signals (i.e. ES1 or ES2) so as to obtain the distance information. Namely, if the control unit 111 obtains the left sheltering information, the control unit 111 would further calculate the distance between the object 30 and the ultrasonic transducer 101 (i.e. time $T_A$*sound velocity). On the contrary, if the control unit 111 obtains the right sheltering information, the control unit 111 would further calculate the distance between the object 30 and the ultrasonic transducer 103 (i.e. time $T_B$*sound velocity) (in Step S323). Once the control unit 111 obtains the left or the right sheltering information and the distance information, the control unit 111 would correspondingly output the above-mentioned input signal INS according to the left or the right sheltering information and/or the distance information (in Step S325), and thereafter clear all of the data stored in its internal memory (in Step S327) to return the operation flow back to Step S303.

However, when the control unit 111 determines that all the echo signals (i.e. ES1 and/or ES2) which are greater than the threshold value and determined by the receiving circuit unit 107 for the second predetermined time are not only returned from one of the ultrasonic transducers 101 and 103 (i.e. the determination result in Step S321 is "No"), the control unit 111 would first calculate the distance between the object 30 and the ultrasonic transducer 101 (i.e. time $T_A$*sound velocity) and the distance between the object 30 and the ultrasonic transducer 103 (i.e. time $T_B$*sound velocity), so as to obtain the distance information (in Step S329). Next, the control unit 111 would calculate and obtain the left-right motion speed information according to times $T_A$ and $T_B$ respectively from the ultrasonic transducers 101 and 103 for sending the transmitting signals TS1 and TS2 to the $1^{st}$ echo signals ES1 and ES2 received by the control unit 111 (in Step S331). Herein, a distance between the ultrasonic transducers 101 and 103 is defined as D, such that the left-right motion speed information obtained by the control unit 111 is $D/(T_A-T_B)$.

Next, the control unit 111 would respectively multiply a weighting value with all of the stored echo signals ES1 and ES2 greater than the threshold value for the second predetermined time, so as to calculate and obtain the motion information from left to right or right to left (in Step S333). For example, suppose the control unit 111 stored five echo signals ES1 and ES2 greater than the threshold value for the second predetermined time, and the sequence of storing these five echo signals ES1 and ES2 is ES1, ES1, ES2, ES1 and ES2. Moreover, a weighting array implemented by the internal memory of the control unit 111 and embedded in the control unit 111 also stores five weighting values such as 10, 8, 5, 3 and 1. The control unit 111 may store all of echo signals ES1 greater than the threshold value and determined by the receiving circuit unit 107 for the second predetermined time to be represented as positive logic "1" (i.e. +1) in its internal memory, and may store all of echo signals ES2 greater than the threshold value and determined by the receiving circuit unit 107 for the second predetermined time to be represented as negative logic "1" (i.e. −1) in its internal memory. Therefore, the control unit 111 would first respectively multiply the weighting values 10, 8, 5, 3 and 1 with the echo signals ES1(+1), ES1(+1), ES2(−1), ES1(+1) and ES2(−1), namely, ES1(+1)*10, ES1(+1)*8, ES2(−1)*5, ES1(+1)*3 and ES2(−1)*1, and then perform an accumulation to obtain an accumulation value, namely, 10+8−5+2+2=16. Herein, it is defined that if the accumulation value is greater than 0, the control unit 111 would judge the object 30 to be waving from above the ultrasonic transducer 103 to above the ultrasonic transducer 101; namely, from right to left. In addition, if the accumulation value is smaller than 0, the control unit 111 would judge the object 30 to be waving from above the ultrasonic transducer 101 to above the ultrasonic transducer 103; namely, from left to right. Accordingly, when the control unit 111 judges that the accumulation value (i.e. 16) is greater than 0, the control unit 111 would obtain the motion information from right to left. Once the control unit 111 obtains the motion information from left to right or right to left, the left-right motion speed information and the distance information, the control unit 111 would correspondingly output the above-mentioned input signal INS according to the motion information from left to right or right to left, the left-right motion speed information and/or the distance information (in Step S335), and thereafter clear all of the data stored in its internal memory (in Step S327) to return the operation flow back to Step S303.

Figure 5:
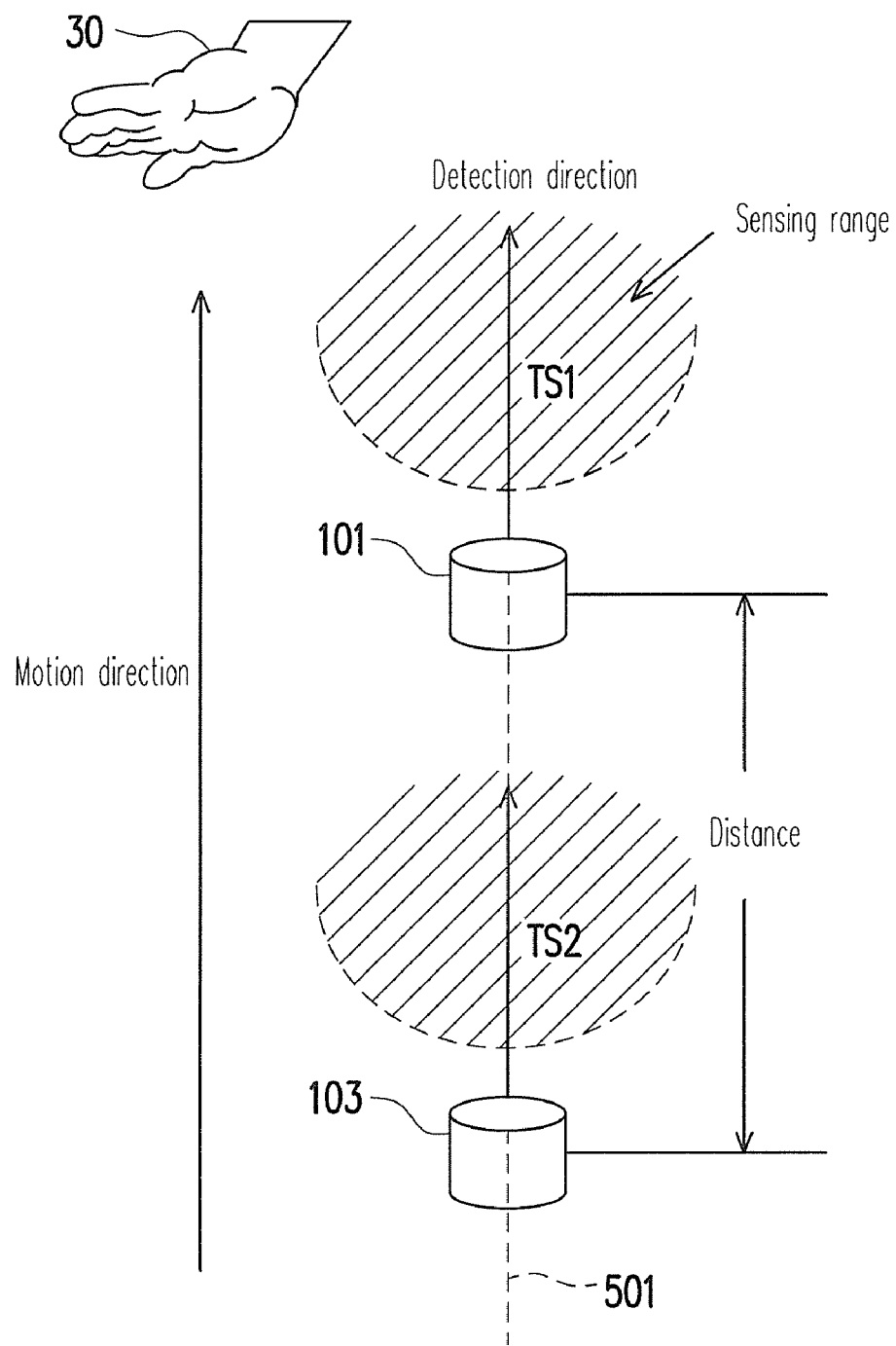
FIG. 5 is a diagram of two ultrasonic transducers which are located at a same vertical plane line according to an embodiment of the present disclosure.
Figure 6:
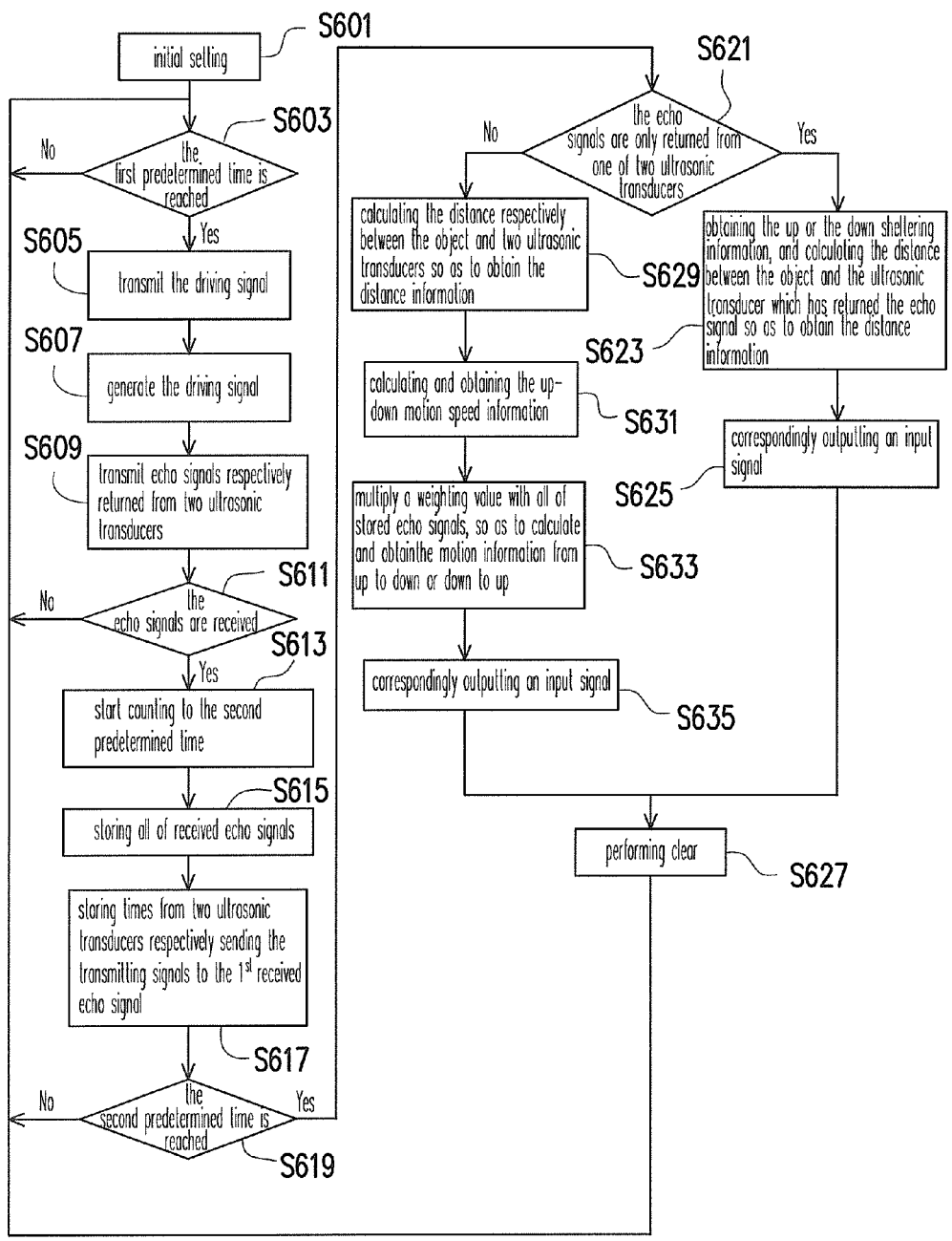
FIG. 6 is another operation flow chart of the control unit in FIG. 1.

The operation flow chart of the control unit 111 shown in FIG. 3 is an illustration based on the ultrasonic transducers 101 and 103 locating at the same horizontal plane line 201, namely, the relative left-right motion for the object 30 relating to the ultrasonic transducers 101 and 103. However, suppose the ultrasonic transducers 101 and 103 are located at a same vertical plane line 501 as shown in FIG. 5, then the operation flow chart of the control unit 111 would be similar to FIG. 6. Referring to FIG. 6, Steps S601 to S621 and Steps S627 to S629 in the operation flow chart of the control unit 111 are respectively similar to Steps S301 to S321 and Steps S327 to S329 in the operation flow chart as shown in FIG. 3. A difference between FIGS. 3 and 6 is that, in FIG. 6, Steps S623, S625 and S631 to S635 purpose to obtain an up sheltering information, a down sheltering information, a motion information from up to down, a motion information from down to up, and an up-down motion speed information, so as to obtain the relative up-down motion for the object 30 relating to the ultrasonic transducers 101 and 103. Therefore, the operation flow chart of the control unit 111 as shown in FIG. 6 may be analogized by referring to the operation flow chart shown in FIG. 3, such that further description in detail would not be needed herein.

The above embodiments describe only two ultrasonic transducers 101 and 103 in the input device 10, located at the same horizontal plane line 201 or the same vertical plane line 501, for the purpose of explanation. In other embodiments of the present disclosure, however, more ultrasonic transducers (e.g., 3 or 4 ultrasonic transducers) may be added into the input device 10, so as to simultaneously obtain the relative left-right and up-down motion for the object 30 relating to such ultrasonic transducers.

Figure 7:
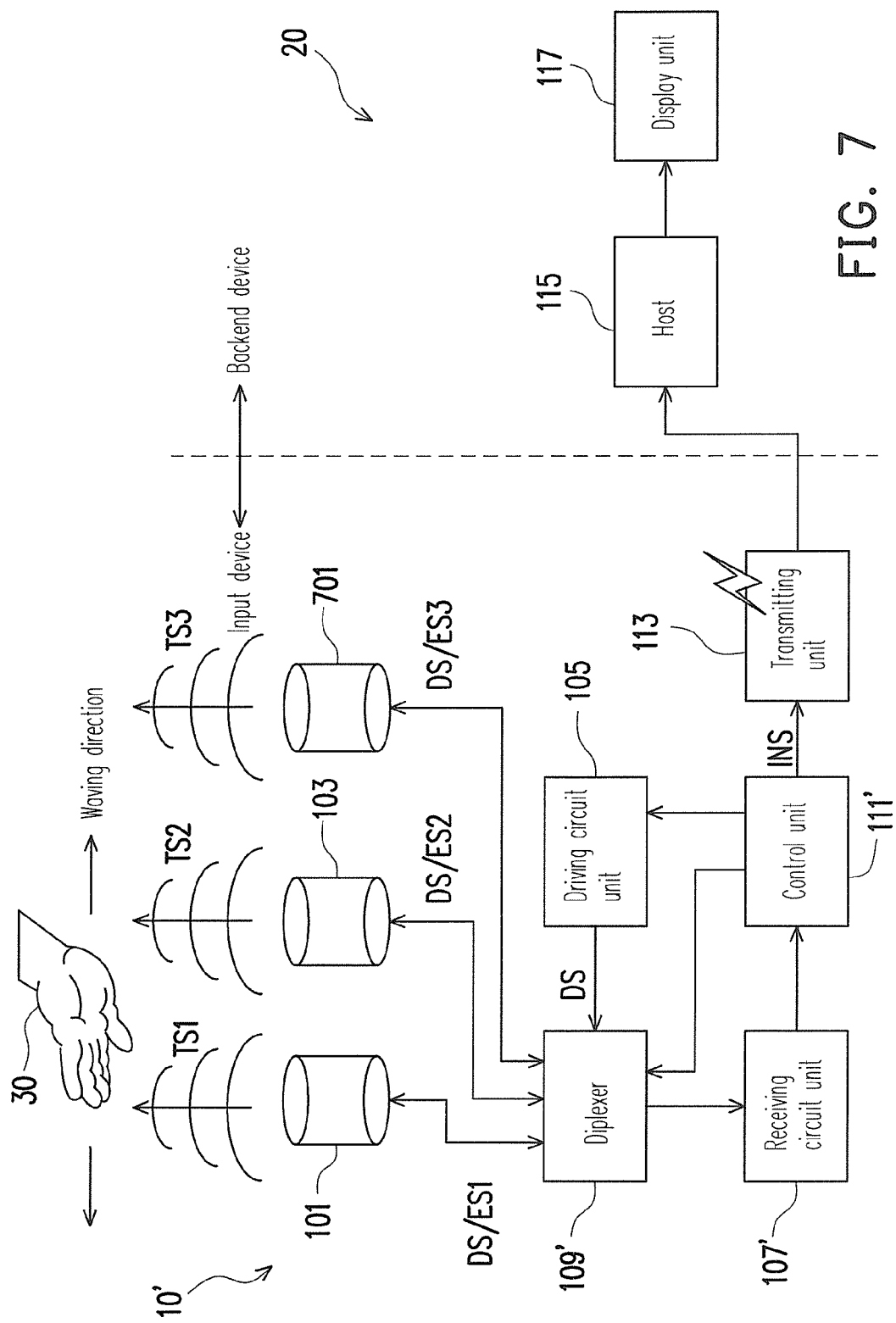
FIG. 7 is a diagram of an electronic device with motion detection ability according to another embodiment of the present disclosure.

FIG. 7 is a diagram of an electronic device 700 with motion detection ability according to another embodiment of the present disclosure. Referring to FIGS. 1 and 7, a difference between the electronic devices 100 and 700 is that the input device 10' further has one ultrasonic transducer 701 more than the input device 10. Accordingly, the receiving circuit unit 107' may further have the capability of determining whether the echo signals ES1, ES2 and ES3 respectively returned from the ultrasonic transducers 101, 103 and 701 are greater than the threshold value or not. The diplexer 109' may further have the capability of receiving and transmitting the driving signal DS generated by the driving circuit unit 105 to the ultrasonic transducers 101, 103 and 701, or receiving and transmitting the echo signals ES1, ES2 and ES3 respectively returned from the ultrasonic transducers 101, 103 and 701 to the receiving circuit unit 107'.

The control unit 111' may further have the capabilities of controlling the diplexer 109' to transmit the driving signal DS generated by the driving circuit unit 105 to the ultrasonic transducers 101, 103 and 701, or controlling the diplexer 109' to transmit the echo signals ES1, ES2 and ES3 respectively returned from the ultrasonic transducers 101, 103 and 701 to the receiving circuit unit 107'; obtaining a relative motion information between the object 30 and at least one of the ultrasonic transducers 101, 103 and 701 according to all of echo signals ES1, ES2 and/or ES3 which are greater than the threshold value and determined by the receiving circuit unit 107' for each of the plurality of second predetermined times, so as to correspondingly output an input signal INS; storing all of the echo signals ES1, ES2 and/or ES3 which are greater than the threshold value and determined by the receiving circuit unit 107' for each of the plurality of second predetermined times; storing time(s) from at least one of the ultrasonic transducers 101, 103 and 701 sending the transmitting signal TS1, TS2, TS3 to the $1^{st}$ echo signal ES1, ES2 and/or ES3 which are/is greater than the threshold value and determined by the receiving circuit unit 107' for each of the plurality of second predetermined times; and determining whether all of the echo signals ES1, ES2 and/or ES3 which are greater than the threshold value and determined by the receiving circuit unit 107' for each of the plurality of second predetermined times are only returned from one of the ultrasonic transducers 101, 103 and 701 or not.

Figure 8:
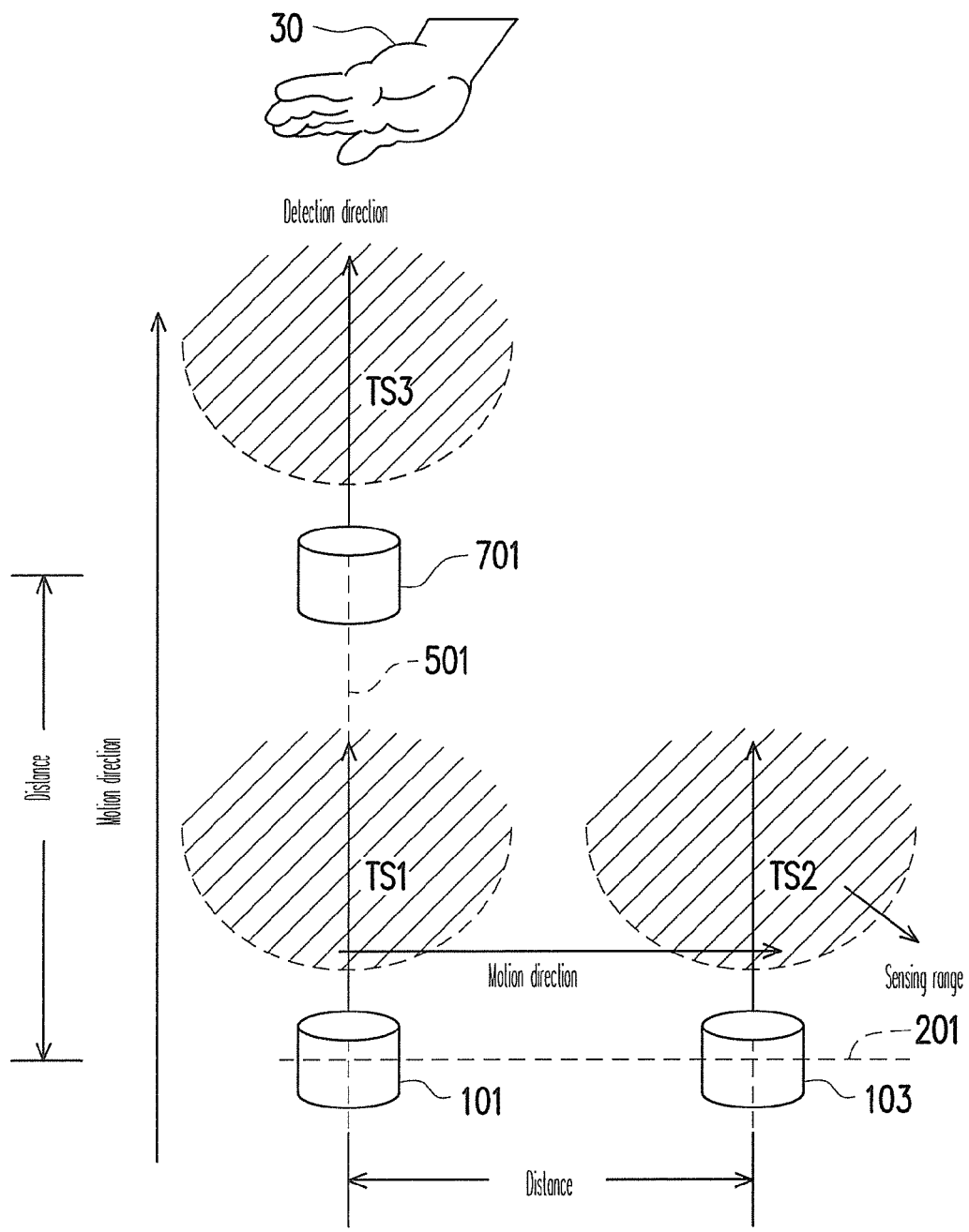
FIG. 8 is a configuration diagram of three ultrasonic transducers according to an embodiment of the present disclosure.

In this embodiment, when the ultrasonic transducers 101 and 103 are located at the same horizontal plane line 201, and the ultrasonic transducers 101 and 701 are located at the same vertical plane line 501 as shown in FIG. 8, the relative motion information between the object 30 and at least one of the ultrasonic transducers 101, 103 and 701 and obtained by the control unit 111' includes a left/down sheltering information, a right sheltering information, a motion information from left to right, a motion information from right to left, an up sheltering information, a motion information from up to down, a motion information from down to up, a left-right motion speed information, an up-down motion speed information and/or a distance information, wherein the distance information is the distance between the object 30 and at least one of the ultrasonic transducers 101, 103 and 701.

Figure 9:
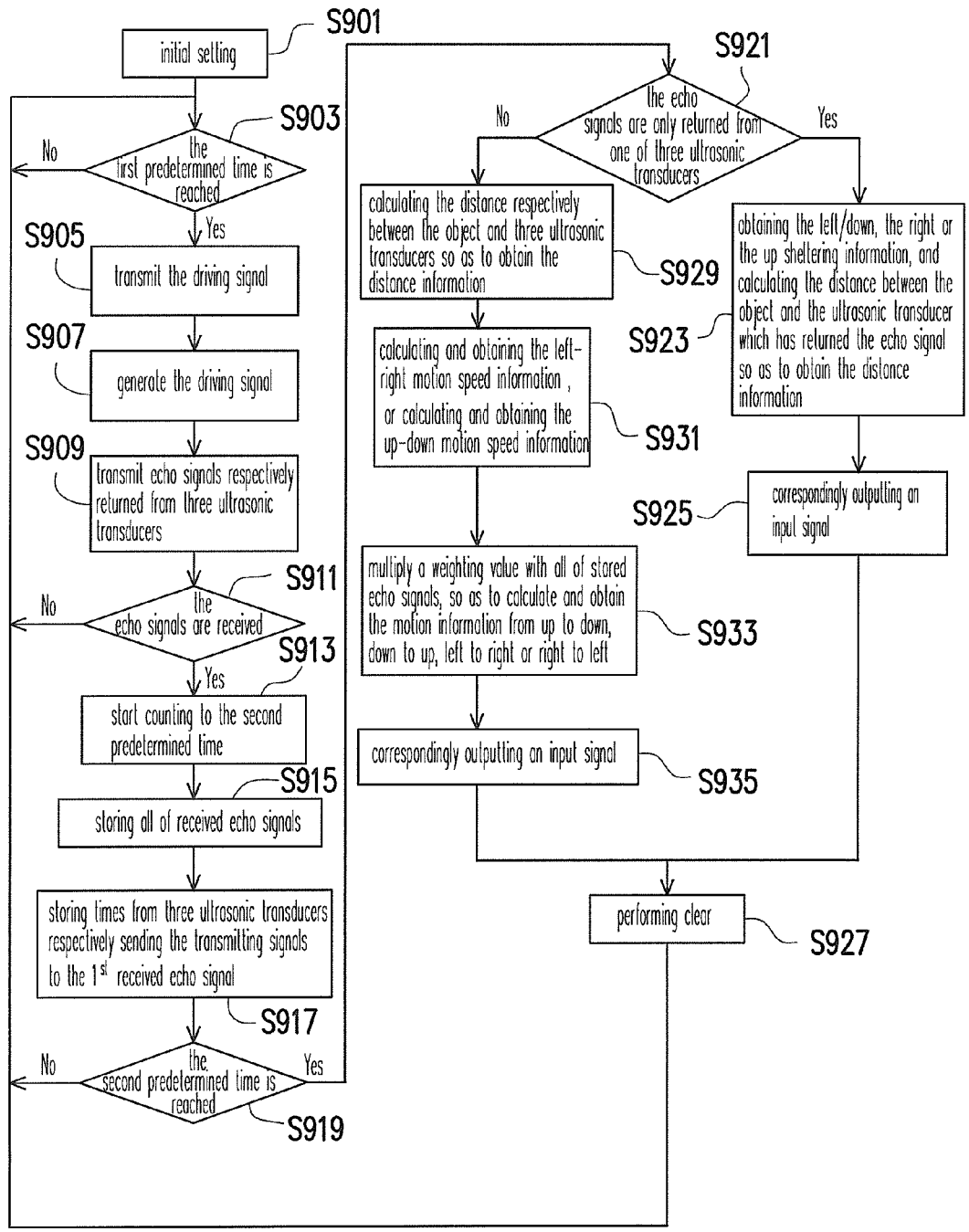
FIG. 9 is an operation flow chart of a control unit in FIG. 7.

Based on the conditions of that the ultrasonic transducers 101 and 103 are located at the same horizontal plane line 201, and the ultrasonic transducers 101 and 701 are located at the same vertical plane line 501, FIG. 9 is an operation flow chart of the control unit 111' according to an embodiment of the present disclosure. Referring to FIG. 9, the operation flow chart of the control unit 111' can be seen as a synthesis of FIGS. 3 and 6. Accordingly, a person ordinarily skilled in the art should be able to analogize/deduce the details of the operation flow chart shown in FIG. 9 of the control unit 111' by referring to the operation flow charts of FIGS. 3 and 6, such that a further detailed description would not be necessary herein.

It should be noted that when the control unit 111' determines that all the echo signals (i.e. ES1, ES2 or ES3) which are greater than the threshold value and determined by the receiving circuit unit 107' for the second predetermined time are only returned from the ultrasonic transducer 101, 103 and 701, the relative motion information obtained by the control unit 111' includes the left/down, the right or the up sheltering information and the distance information. In addition, when the control unit 111' determines that all the echo signals (i.e. ES1, ES2 and/or ES3) which are greater than the threshold value and determined by the receiving circuit unit 107' for the second predetermined time are only returned from the ultrasonic transducer 101, 103 and 701, the relative motion information obtained by the control unit 111' includes the motion information from left to right, right to left, up to down or down to up, the left-right and/or up-down motion speed information, and the distance information. Accordingly, to the electronic device 700 with motion detection ability may simultaneously obtain the relative up-down and left-right motion for the object 30 relating to the ultrasonic transducers 101, 103 and 701.

In addition, the ultrasonic transducers 101, 103 and 701 of the above embodiment are the transmitting/receiving type of ultrasonic transducers, so-called "transceiver" (i.e. self-sending and self-receiving), but in the other embodiments of the present disclosure, one of the ultrasonic transducers 101, 103 and 701 (e.g., the ultrasonic transducer 103) may be modified to a transmitting type of ultrasonic transducers, so-called "transmitter" (i.e. sending), and the rest of the ultrasonic transducers 101 and 701 may be changed to a receiving type of ultrasonic transducers, so-called "receiver" (i.e. receiving). Accordingly, such embodiments also can achieve a technical efficiency similar to the above embodiment, and the diplexer 109' can be omitted to reduce the cost. However, in this case, the driving circuit 105 should be directly coupled to the sending type of the ultrasonic transducer 103, and the receiving type of the ultrasonic transducers 101 and 701 need to directly couple to the receiving circuit unit 107'.

Figure 10:
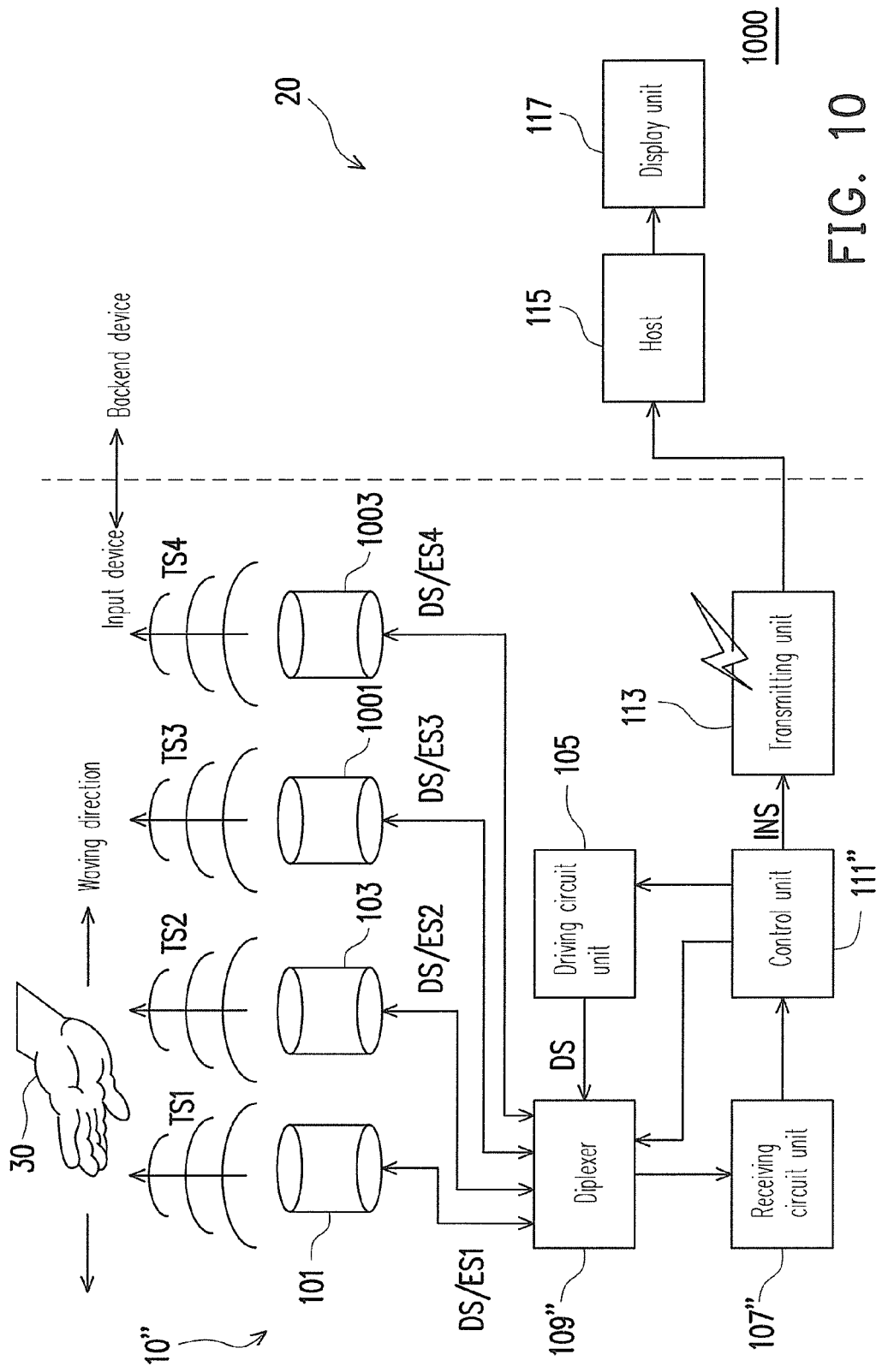
FIG. 10 is a diagram of an electronic device with motion detection ability according to another embodiment of the present disclosure.

FIG. 10 is a diagram of an electronic device 1000 with motion detection ability according to another embodiment of the present disclosure. Referring to FIGS. 1 and 10, a difference between electronic devices 100 and 1000 is that the input device 10" further has two ultrasonic transducers 1001 and 1003 more than the input device 10. Accordingly, the receiving circuit unit 107" may further have a capability of determining whether echo signals ES1, ES2, ES3 and ES4 respectively returned from the ultrasonic transducers 101, 103, 1001 and 1003 are greater than the threshold value or not. The diplexer 109" may further have a capability of receiving and transmitting the driving signal DS generated by the driving circuit unit 105 to the ultrasonic transducers 101, 103, 1001 and 1003, or receiving and transmitting the echo signals ES1, ES2, ES3 and ES4 respectively returned from the ultrasonic transducers 101, 103, 1001 and 1003 to the receiving circuit unit 107".

The control unit 111" may further have the capabilities of controlling the diplexer 109" to transmit the driving signal DS generated by the driving circuit unit 105 to the ultrasonic transducers 101, 103, 1001 and 1003, or controlling the diplexer 109" to transmit the echo signals ES1, ES2, ES3 and ES4 respectively returned from the ultrasonic transducers 101, 103, 1001 and 1003 to the receiving circuit unit 107"; obtaining a relative motion information between the object 30 and at least one of the ultrasonic transducers 101, 103, 1001 and 1003 according to all of echo signals ES1, ES2, ES3 and/or ES4 which are greater than the threshold value and determined by the receiving circuit unit 107" for each of the plurality of second predetermined times so as to correspondingly output an input signal INS; storing all of the echo signals ES1, ES2, ES3 and/or ES4 which are greater than the threshold value and determined by the receiving circuit unit 107" for each of the plurality of second predetermined times; storing time(s) from at least one of the ultrasonic transducers 101, 103, 1001 and 1003 sending the transmitting signal TS1, TS2, TS3, TS4 to the $1^{st}$ echo signal ES1, ES2, ES3 and/or ES4 which are/is greater than the threshold value and determined by the receiving circuit unit 107" for each of the second predetermined times; and determining whether all of the echo signals ES1, ES2, ES3 and/or ES4 which are greater than the threshold value and determined by the receiving circuit unit 107" for each of the plurality of second predetermined times are only returned from one of the ultrasonic transducers 101, 103, 1001 and 1003 or not.

Figure 11A:
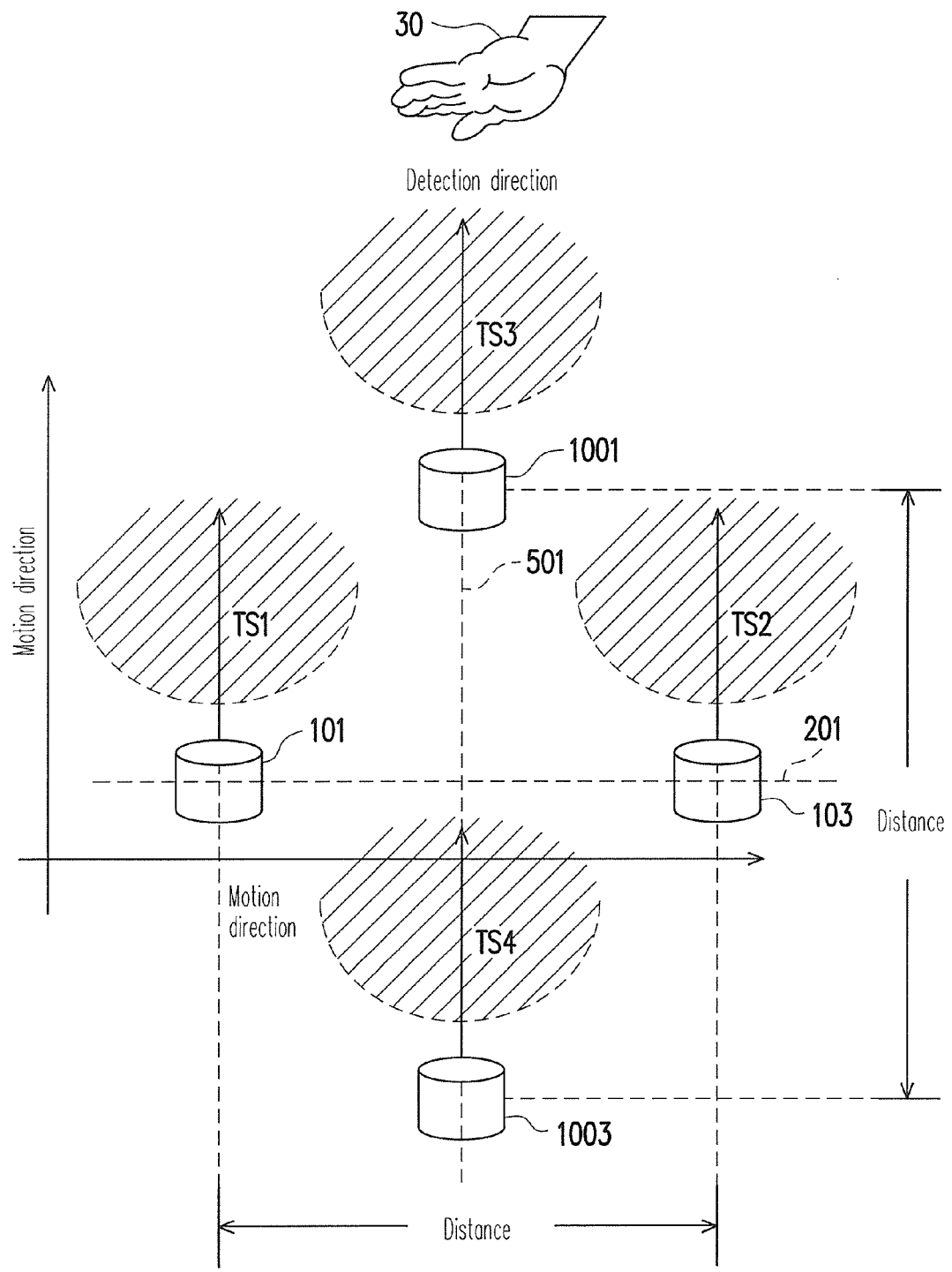
FIGS. 11A and 11B are respective configuration diagrams of four ultrasonic transducers according to an embodiment of the present disclosure.
Figure 11B:
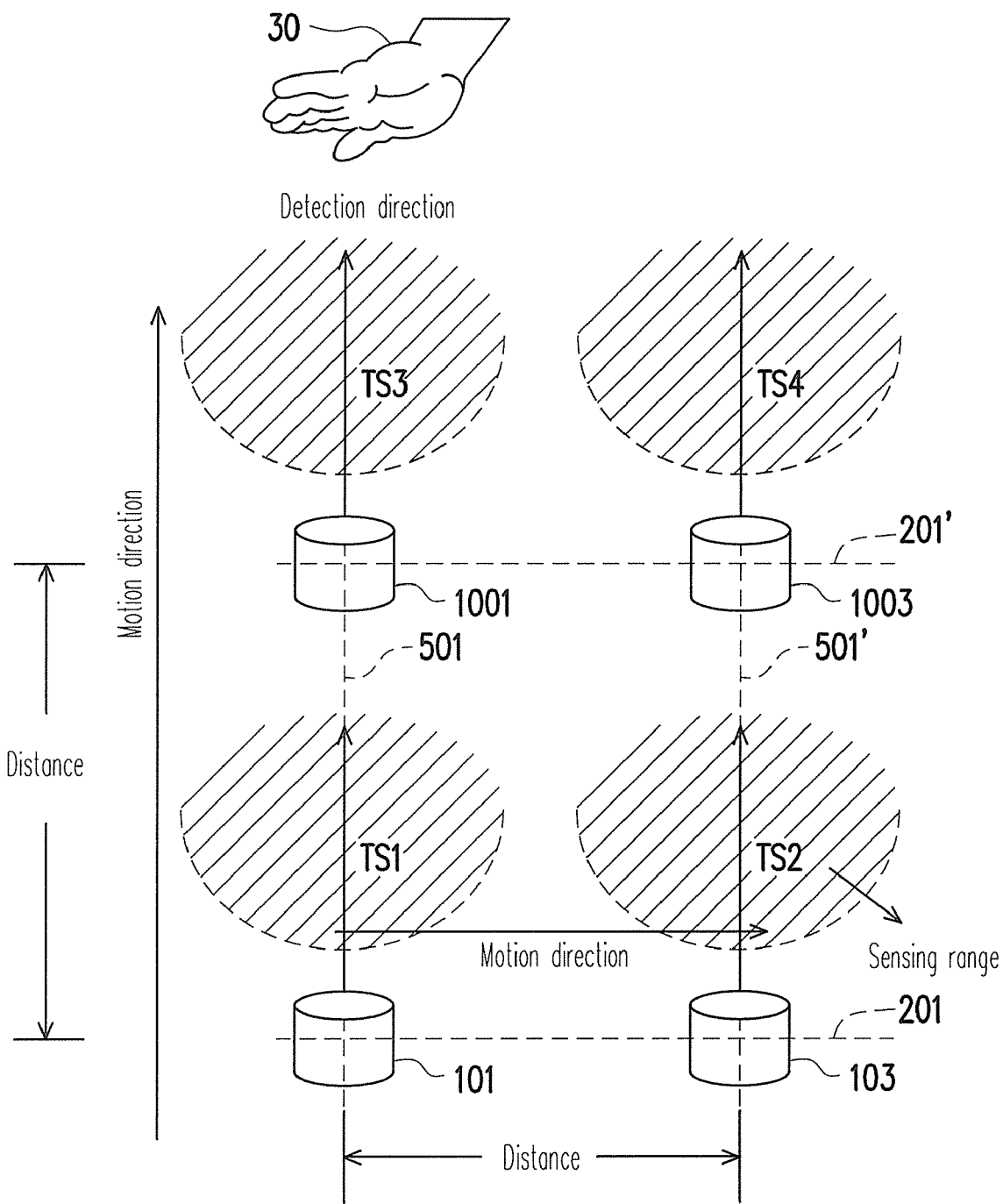

In this embodiment, when the ultrasonic transducers 101 and 103 are located at the same horizontal plane line 201, and the ultrasonic transducers 1001 and 1003 are located at the same vertical plane line 501 as shown in FIG. 11A, or when the ultrasonic transducers 101 and 103 are located at the same horizontal plane line 201, the ultrasonic transducers 1001 and 1003 are located at another same horizontal plane line 201', the ultrasonic transducers 101 and 1001 are located at the same vertical plane line 501 and the ultrasonic transducers 103 and 1003 are located at another same vertical plane line 501' as shown in FIG. 11B, the relative motion information between the object 30 and at least one of the ultrasonic transducers 101, 103, 1001 and 1003 and obtained by the control unit 111" includes a left sheltering information, a right sheltering information, a motion information from left to right, a motion information from right to left, an up sheltering information, a down sheltering information, a motion information from up to down, a motion information from down to up, a left-right motion speed information, an up-down motion speed information and/or a distance information, wherein the distance information is a distance between the object and at least one of the four ultrasonic transducers.

Figure 12:
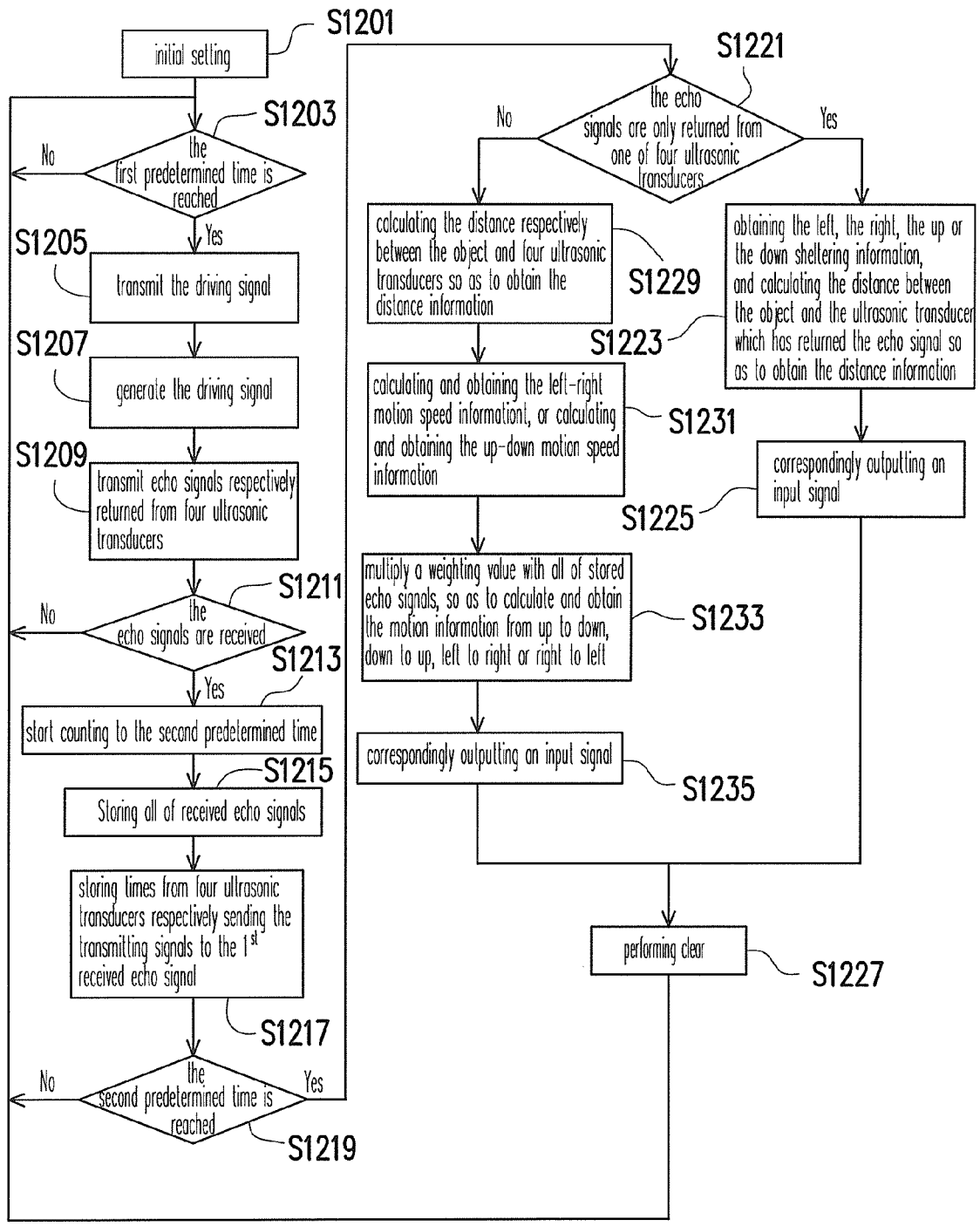
FIG. 12 is an operation flow chart of a control unit in FIG. 10.

Based on the conditions of that the ultrasonic transducers 101 and 103 are located at the same horizontal plane line 201, and the ultrasonic transducers 1001 and 1003 are located at the same vertical plane line 501 as shown in FIG. 11A, or based on the conditions of that when the ultrasonic transducers 101 and 103 are located at the same horizontal plane line 201, the ultrasonic transducers 1001 and 1003 are located at another same horizontal plane line 201', the ultrasonic transducers 101 and 1001 are located at the same vertical plane line 501 and the ultrasonic transducers 103 and 1003 are located at another same vertical plane line 501' as shown in FIG. 11B, FIG. 12 is an operation flow chart of the control unit 111" according to an embodiment of the present disclosure. Referring to FIG. 12, the operation flow chart of the control unit 111" shown in FIG. 12 can be seen as a synthesis of FIGS. 3, 6 and 9. Accordingly, a person ordinarily skilled in the art should be able to analogize/deduce the details of the operation flow chart shown in FIG. 12 of the control unit 111" by referring to the operation flow charts shown in FIGS. 3, 6 and 9, such that further description in detail would not be necessary herein.

It should be noted that when the control unit 111" determines that all the echo signals (i.e. ES1, ES2, ES3 or ES4) which are greater than the threshold value and determined by the receiving circuit unit 107" for the second predetermined time are only returned from the ultrasonic transducer 101, 103, 1001 and 1003, the relative motion information obtained by the control unit 111" includes the left, the right, the up or the down sheltering information and the distance information. In addition, when the control unit 111" determines that all the echo signals (i.e. ES1, ES2, ES3 and/or ES4) which are greater than the threshold value and determined by the receiving circuit unit 107" for the second predetermined time are only returned from the ultrasonic transducer 101, 103, 1001 and 1003, the relative motion information obtained by the control unit 111" includes the motion information from left to right, right to left, up to down or down to up, the left-right and/or up-down motion speed information, and the distance information.

In addition, the ultrasonic transducers 101, 103, 1001 and 1003 of the above embodiment are the transmitting/receiving type of ultrasonic transducers, so-called "transceiver", but in the other embodiments of the present disclosure, two of the ultrasonic transducers 101, 103, 1001 and 1003 (e.g., the ultrasonic transducers 101 and 1001) may be changed to the transmitting type of ultrasonic transducers, so-called "transmitter", and the rest of the ultrasonic transducers 103 and 1003 may be changed to the receiving type of ultrasonic transducers, so-called "receiver". Accordingly, such embodiments also can achieve the technical efficiency similar to the above embodiment, and the diplexer 109" can be omitted to reduce the cost. However, in this case, the driving circuit 105 should be directly coupled to the sending type of the ultrasonic transducers 101 and 1001, and the receiving type of the ultrasonic transducers 101 and 701 need to directly couple to the receiving circuit unit 107".

In summary, the input devices submitted by the present disclosure may allow an user to achieve an effect of touchless operation input by simply waving hands without the user having to wear any sensing devices/sensors. The technical manner is based on the principle of ultrasonic sensing to achieve the purpose of detecting the direction and speed of waving hands, and the distance between hand(s) and the sensing device(s) (i.e. ultrasonic transducer) by changing the configuration of the sensing devices. In addition, in different application situations, the input devices submitted by the present disclosure may associate with different backend devices (for example, application programs) to achieve a same purpose of the touch input operation, such that the age groups for application may increase, and further, usage convenience is added while misgivings about virus infections resulting from touch operation is reduced.

It will be apparent to those skills in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An input device, comprising:
   at least two ultrasonic transducers driven by a driving signal, for respectively sending a transmitting signal to sense an object, and when the ultrasonic transducers sense the object, each of the ultrasonic transducers generates an echo signal;
   a driving circuit unit, for generating the driving signal;
   a receiving circuit unit, for determining whether echo signals respectively returned from the ultrasonic transducers are greater than a threshold value or not;
   a diplexer, coupled to the ultrasonic transducers, the driving circuit unit and the receiving circuit unit, for receiving and transmitting the driving signal to the ultrasonic transducers, or receiving and transmitting the echo signals respectively returned from the ultrasonic transducers to the receiving circuit unit; and
   a control unit, coupled to the driving circuit unit, the receiving circuit unit and the diplexer, for controlling the driving circuit unit to generate the driving signal for each of a plurality of first predetermined time, controlling the diplexer to transmit the driving signal or transmit the echo signals respectively returned from the ultrasonic transducers, and obtaining a relative motion information between the object and at least one of the ultrasonic transducers according to all of the echo signals which are greater than the threshold value and determined by the receiving circuit unit for each of a plurality of second predetermined times, so as to correspondingly output an input signal,
   wherein the relative motion information comprises at least a sheltering information, a motion information, a motion speed information and a distance information; and the input signal corresponding to a combination of the sheltering information, the motion information, the motion speed information and the distance information.

2. The input device according to claim 1, wherein the control unit is further for counting each of the plurality of first and second predetermined times, storing all of the echo signals which are greater than the threshold value and determined by the receiving circuit unit for each of the plurality of second predetermined times, storing a time from at least one of the ultrasonic transducers sending the transmitting signal to a $1^{st}$ echo signal which is greater than the threshold value and determined by the receiving circuit unit for each of the plurality of second predetermined times, and determining whether all of the echo signals which are greater than the threshold value and determined by the receiving circuit unit for each of the plurality of second predetermined times are only returned from one of the ultrasonic transducers or not.

3. The input device according to claim 1, wherein the sheltering information comprises at least a left sheltering information, a right sheltering information, an up sheltering information and a down sheltering information; the motion information comprises at least a motion information from left to right, a motion information from right to left, a motion information from up to down and a motion information from down to up; the motion speed information at least comprises a left-right motion speed information and an up-down motion speed information; and the distance information is a distance between the object and at least one of the ultrasonic transducers.

4. The input device according to claim 2, wherein when the control unit determines that all of the echo signals which are greater than the threshold value and determined by the receiving circuit unit for each of the plurality of second predetermined times are only returned from one of the ultrasonic transducers, the relative motion information comprises the left, the right, the up or the down sheltering information and the distance information.

5. The input device according to claim 2, wherein when the control unit determines that all of the echo signals which are greater than the threshold value and determined by the receiving circuit unit for each of the plurality of second predetermined times are not only returned from one of the ultrasonic transducers, the relative motion information comprises the motion information from left to right, right to left, up to down and/or down to up, the left-right and/or the up-down motion speed information and the distance information.

6. The input device according to claim 2, wherein after the control unit obtains the relative motion information to correspondingly output the input signal, the control unit clears all of the echo signals which are greater than the threshold value and determined by the receiving circuit unit for each of the plurality of second predetermined times, and the time from at least one of the ultrasonic transducers sending the transmitting signal to the $1^{st}$ echo signal which is greater than the threshold value and determined by the receiving circuit unit for each of the plurality of second predetermined times.

7. The input device according to claim 1, further comprising:
a transmitting unit, coupled to the control unit, for transmitting the input signal by a wired or wireless transmission mode.

8. An input device, comprising:
at least one first ultrasonic transducer driven by a driving signal, for sending a transmitting signal to sense an object;
at least two second ultrasonic transducers, wherein when the transmitting signal senses the object, each of the second ultrasonic transducers generates an echo signal;
a driving circuit unit, coupled to the first ultrasonic transducer, for generating the driving signal;
a receiving circuit unit, coupled to the second ultrasonic transducers, for determining whether the echo signals respectively returned from the second ultrasonic transducers are greater than a threshold value or not;
a control unit, coupled to the driving circuit unit and the receiving circuit unit, for controlling the driving circuit unit to generate the driving signal for each of a plurality of first predetermined times, and obtaining a relative motion information between the object and at least one of the second ultrasonic transducers according to all of echo signals which are greater than the threshold value and determined by the receiving circuit unit for each of a plurality of second predetermined times, so as to correspondingly output an input signal,
wherein the relative motion information comprises at least a sheltering information, a motion information, a motion speed information and a distance information; and the input signal is corresponding to a combination of the sheltering information, the motion information, the motion speed information and the distance information.

9. The input device according to claim 8, wherein the control unit is further for counting each of the plurality of first and second predetermined times, storing all of the echo signals which are greater than the threshold value and determined by the receiving circuit unit for each of the plurality of second predetermined times, storing a time from at least one of the second ultrasonic transducers sending the transmitting signal to a $1^{st}$ echo signal which is greater than the threshold value and determined by the receiving circuit unit for each of the plurality of second predetermined times, and determining whether all of the echo signals which are greater than the threshold value and determined by the receiving circuit unit for each of the plurality of second predetermined times are only returned from one of the second ultrasonic transducers or not.

10. The input device according to claim 8, wherein the sheltering information comprises at least a left sheltering information, a right sheltering information, an up sheltering information and a down sheltering information; the motion information comprises at least a motion information from left to right, a motion information from right to left, a motion information from up to down and a motion information from down to up; the motion speed information at least comprises a left-right motion speed information and an up-down motion speed information; and the distance information is a distance between the object and at least one of the second ultrasonic transducers.

11. The input device according to claim 9, wherein when the control unit determines that all of the echo signals which are greater than the threshold value and determined by the receiving circuit unit for each of the plurality of second predetermined time are only returned from one of the second ultrasonic transducers, the relative motion information comprises the left, the right, the up or the down sheltering information and the distance information.

12. The input device according to claim 9, wherein when the control unit determines that all of the echo signals which are greater than the threshold value and determined by the receiving circuit unit for each of the plurality of second predetermined times are not only returned from one of the second ultrasonic transducers, the relative motion information comprises the motion information from left to right, right to left, up to down and/or down to up, the left-right and/or the up-down motion speed information and the distance information.

13. The input device according to claim 9, wherein after the control unit obtains the relative motion information to correspondingly output the input signal, the control unit clears all of the echo signals which are greater than the threshold value and determined by the receiving circuit unit for each of the plurality of second predetermined times, and the time from at least one of the second ultrasonic transducers sending the transmitting signal to the $1^{st}$ echo signal which is greater than the threshold value and determined by the receiving circuit unit for each of the plurality of second predetermined time.

14. The input device according to claim 8, further comprising:
a transmitting unit, coupled to the control unit, for transmitting the input signal by a wired or wireless transmission mode.

* * * * *